United States Patent [19]

Schleder et al.

[11] Patent Number: 5,469,172
[45] Date of Patent: Nov. 21, 1995

[54] CALIBRATION METHOD AND APPARATUS FOR RECEIVING TRANSPONDER REPLY SIGNALS

[75] Inventors: William E. Schleder; Albert D. Eggleston, both of Dublin, Ohio

[73] Assignee: BF Goodrich FlightSystem, Inc., Columbus, Ohio

[21] Appl. No.: 153,737

[22] Filed: Nov. 16, 1993

[51] Int. Cl.⁶ .................................................. G01S 7/40
[52] U.S. Cl. ............................................................ 342/174
[58] Field of Search .................................. 342/174, 165, 342/42, 51, 43

[56] References Cited

U.S. PATENT DOCUMENTS 3,854,133  12/1974  Cabion .................................. 342/174

*Primary Examiner*—Daniel T. Pihulic
*Attorney, Agent, or Firm*—Leonard L. Lewis; William E. Zitelli

[57] ABSTRACT

Calibration apparatus for an antenna/receiver system having, in combination, means for receiving one or more electromagnetic data encoded signals from a transmitter and producing in response to each data signal two signals having a phase relationship, the receiving means comprising an antenna; signal processing means for using the phase relationship to determine information related to the data signals; and means for coupling a calibration signal into the antenna to produce two calibration signals having a known phase relationship; the signal processing means using the known phase relationship to compensate for phase errors when processing the data signals.

23 Claims, 1 Drawing Sheet

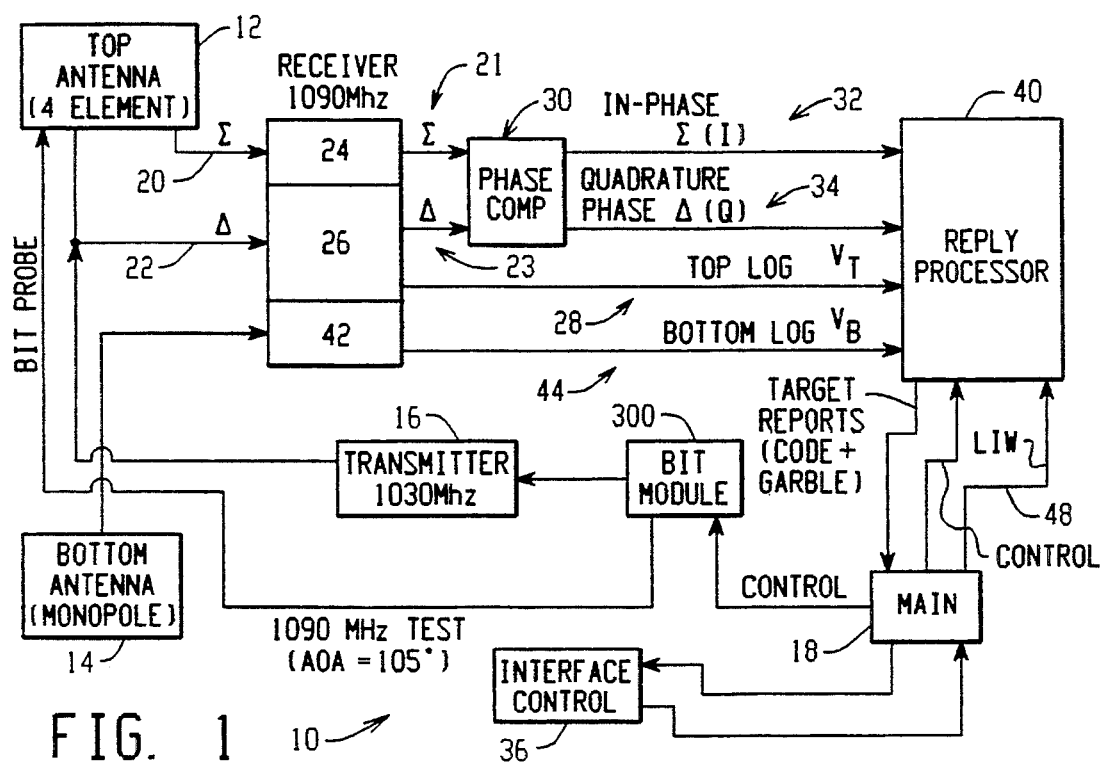
FIG. 1
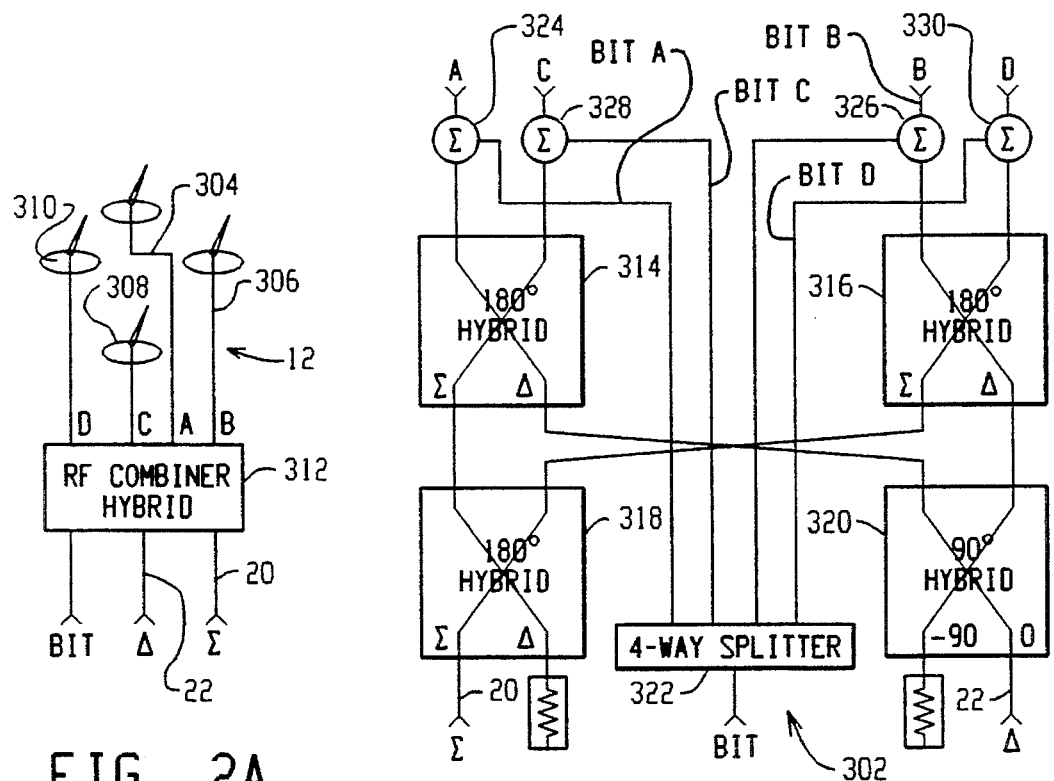
FIG. 2A
FIG. 2B

CALIBRATION METHOD AND APPARATUS FOR RECEIVING TRANSPONDER REPLY SIGNALS

BACKGROUND OF THE INVENTION

This patent application is related to co-pending U.S. patent application Ser. No. 08/153,724, filed on even date herewith, entitled "METHOD AND APPARATUS FOR MULTIPLE REPLY REJECTION WHEN DECODING TRANSPONDER REPLY SIGNALS"; and Ser. No. 08/153,722, also filed on even date herewith, entitled "METHOD AND APPARATUS FOR ASSOCIATING TARGET REPLIES WITH TARGET SIGNATURES"; both co-pending applications being commonly owned by the assignee of the present invention, the entire disclosures of which are fully incorporated herein by reference.

The invention relates generally to receiving and decoding reply signals transmitted from aircraft transponders. More specifically, the invention relates to compensating for phase error introduced into the received and/or processed signals by using calibration signals having a known phase relationship.

Air traffic control and safety are ongoing concerns in commercial and military aviation. Particularly significant concerns are traffic alert and collision avoidance between aircraft either in route between or in the vicinity of landing fields. Ever increasing air traffic demands have resulted in governmental regulations that require commercial carriers to equip planes with active interrogation systems that can determine the presence and threat of nearby aircraft. The particular system mandated by the government depends on the aircraft size. Large commercial aircraft that carry over 30 passengers are being equipped with an active traffic and collision avoidance system (TCAS II) that not only detects and displays nearby aircraft, but also alerts the crew as to impending collisions, and also provides resolution advisories such as audible instructions to the pilot to pull up or down, maintain level or climb rate and so forth. This system, however, is very complex and expensive and therefore has not been mandated for smaller aircraft.

For aircraft that carry up to 30 passengers, governmental regulations require such aircraft be equipped with an active interrogation system (TCAS I) that detects nearby aircraft, determines and displays range, bearing and altitude of such aircraft relative to the interrogating plane, and tracks such aircraft within a prescribed range and also issues an audible alert. Although the operational performance of the TCAS I system appears less complex than TCAS II, numerous problems arise that make a cost effective system difficult to realize.

The Federal Aviation Administration (FAA) specifies that the TCAS I active interrogation systems use air traffic control radar beacon system (ATCRBS) signals. These ATCRBS interrogation signals are high frequency pulse modulated signals at 1030 megahertz. The reply signals are also pulse modulated but at a carrier frequency of 1090 megahertz. In TCAS I, the reply and interrogation signals are transmitted from an interrogation aircraft to other aircraft in the vicinity thereof, and these other aircraft reply to the interrogations via a transponder located on the aircraft.

The interrogation and reply signal waveforms are specified by the FAA. The information contained in the reply signal depends on the type of interrogation (e.g. Mode A, Mode C) and the transponder equipment that the interrogated aircraft has available for responding. For TCAS I, the interrogation mode presently is Mode C, and the Mode C reply signal from the aircraft transponder consists primarily of encoded altitude data. The data is encoded using binary logic states or bits arranged in four octal digit codes (i.e. there are twelve data bits with each octal digit defined by three data bits). The reply signal data bits are transmitted within a pair of framing pulses called bracket pulses that indicate (for purposes of TCAS I) the beginning and end of a reply signal from a particular aircraft responding to an interrogation.

The TCAS I system is specified based on the use of these ATCRBS Mode C reply signal waveforms. Thus, an interrogating aircraft may transmit omnidirectionally an interrogation signal at 1030 MHz, and then will "listen" for Mode C reply signals from all aircraft capable of responding by transmitting the bracket pulses and altitude encoded data bit pulses. Some aircraft are not equipped to reply with altitude data (non-altitude reporting, or NAR) and hence only transmit the bracket pulses. Under TCAS I, aircraft within a range of about 34 nautical miles will reply to a Mode C interrogation.

As part of the reply signal detection and decoding process, a TCAS I compatible system is required to determine angle of arrival of the reply signals from responding aircraft. The angle of arrival information is used to establish a bearing on the responding aircraft relative to the interrogating aircraft. Angle of arrival information is generally determined by phase detection techniques using an antenna array that detects reply signals such that the antenna signals can be combined to produce sum and delta channel signals having a relative phase angle that corresponds to a reply signal angle of arrival.

However, numerous sources of phase error in the system can cause errors in the angle of arrival determinations. For example, antenna cable electrical length differences can cause large phase errors in the antenna signals. These cable induced errors can change over time due to temperature, vibration, aging and so on. Cables can be interchanged, and thus result in mismatches that affect phase determinations. Receiver component variations over time and temperature can also introduce unwanted phase errors. Other sources of phase error include non-linearities in the antenna response characteristics (i.e. electrical angle vs. mechanical angle), as well as non-linearities in the phase comparator used to detect the sum and delta channel phase differences. Phase shifts introduced into the phase comparator inputs due to transmission mismatches can also cause significant phase errors. These are a few of the many possible ways that phase error can be introduced into an antenna/receiver system.

The objective exists, therefore, for a traffic alert and collision avoidance system that utilizes a receiver system capable of detecting phase errors and variations so as to compensate the signal processing to produce output information that is compensated for phase errors and changes. Preferably, the phase compensation should be available throughout normal operation of the system.

SUMMARY OF THE INVENTION

In view of the aforementioned objectives, the invention contemplates, in one embodiment, apparatus for calibrating a receiver system having, in combination, means for receiving one or more electromagnetic data encoded signals from a transmitter and producing in response to each data signal two signals having a phase relationship, the receiving means comprising an antenna; signal processing means for using the phase relationship to determine information related to the data signals; and means for coupling a calibration signal into the antenna to produce two calibration signals having a known phase relationship; the signal processing means using the known phase relationship to compensate for phase errors when processing the data signals.

The invention also contemplates the methods embodied in the use of such apparatus, as well as a method for calibrating an antenna/receiver system of the type that uses an antenna to receive a data signal from a transmitter, means for producing in response to the data signal two electrical signals having a phase relationship, and signal processing means for using the phase relationship to determine characteristics of the encoded signal; the method comprising the steps of:

a. coupling a calibration excitation signal into the antenna to produce two calibration signals having a known phase relationship;

b. detecting a measured phase relationship between the two calibration signals; and c. using detected difference between the known phase relationship and the measured phase relationship to compensate phase relationship information for the two signals corresponding to the data signal.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 1 is system level functional block diagram of a traffic alert and collision avoidance system according to the present invention; and FIGS. 2A and 2B are more detailed illustrations of a top antenna suitable for use with the system of FIG. 1, and particularly for including a built in test and calibration feature according to the present invention.

DETAILED DESCRIPTION OF THE INVENTION

With reference to FIG. 1, an interrogation and reply decoding system for aircraft is shown in system level functional diagram form and generally indicated with the numeral 10. While the invention is described herein with particular reference to an embodiment in an active interrogation system that conforms to the traffic control and collision avoidance system (TCAS I), such description should not be construed in a limiting sense. Various aspects of the invention relating to reply signal detecting and decoding methods and apparatus can be applied in other applications (including passive systems) wherein it is necessary to decode transmitted signals that have characteristics or problems similar to detecting the reply signals used in a TCAS I environment. The invention is more generally directed to apparatus and methods for calibration of systems that rely in part on detecting phase relationships between signals that correspond to, for example, angle of arrival information for signals received by a directional antenna.

The system 10 in this case includes a first or top antenna 12 and a second or bottom antenna 14. The top antenna 12 is used both to transmit interrogation signals from an aircraft in an omnidirectional manner, as well as to receive reply signals from nearby aircraft from any bearing location relative to the interrogating aircraft. The bottom antenna 14 is used only as a non-directional receiving antenna for such reply signals. As used herein, the top antenna is referred to as a directional antenna in that it produces sum and delta channel signals that correspond in phase to the angle of arrival of the reply signals detected by the top antenna. The invention, however, can be used in other system configurations, however, such as, for example, systems that have a bottom mounted directional antenna.

In a TCAS I compatible system such as described herein, the system 10 is installed on an aircraft such as a regional airliner or a commuter aircraft that is used to carry thirty passengers or less. The basic function of the system 10 is to transmit interrogation signals via the top antenna 12 omnidirectionally from the interrogating aircraft. All aircraft that are equipped in a conventional manner with a transponder will detect the interrogation signals and in turn issue a reply signal that is transmitted omnidirectionally from each responding aircraft. The TCAS I reply signal is a pulse encoded signal having a waveform specified by the FAA. The system 10 is configured to receive and detect the reply signals transmitted from the responding aircraft and to decode the reply signals in order to determine range, bearing and relative altitude of the responding aircraft with respect to the interrogating aircraft.

As shown in FIG. 1 then, the system 10 further includes a transmitter section 16 which in this case produces a 1030 MHz amplitude modulated drive signal that is coupled to the top antenna 12. The system 10 is configured to use similar 1030 MHz interrogation signals as used in the secondary surveillance radar portion of the ground base air traffic control system. The system 10 interrogation rate, however, is typically much slower than the interrogation rate of the SSR system, and typically is on the order of an interrogation every one or two seconds.

The 1030 MHz interrogation signal is transmitted from the top antenna 12. A main processor 18 is programmed so as to control, through appropriate timing logic, when the transmission cycles begin and end for the 1030 MHz transmitter 16.

The top antenna 12 functions as a directional receiving antenna. In this case the antenna is preferably a four element monopole array formed in the shape of a square. The output of each of these four elements can be combined, summed and subtracted in a conventional manner so as to produce a sum channel 20 and delta channel 22. As is known to those skilled in the art, these sum and delta channel signals have a relative phase relationship with respect to each other that is an indication of the bearing of the aircraft that transmitted the reply signal. The sum and delta channel signals 20,22 are input to respective sum and delta channel receiver sections 24,26. In the described embodiment, the received signals are characterized by a modulated high frequency carrier signal of 1090 MHz and the receiver sections 24,26 are used in a conventional manner to convert the sum and delta channel signals to a lower intermediate frequency (IF) which in this case is about 60 MHz.

The delta channel receiver 26 is also used to produce a log video signal 28 for the top antenna. The log video signal 28 is an amplitude versus time signal that allows for a determination of the time of arrival of the various pulses that are received as part of each reply signal.

The IF sum and delta channel signals 21,23 are input to a phase comparator 30. The phase comparator 30 may be conventional in design and produces two output signals that are generally referred to as the in-phase and quadrature signals 32,34. Hereinafter the in-phase signal 32 will be represented by a capital letter I and the quadrature phase signal 34 will be represented by the capital letter Q. As is known, the I and Q signals basically represent the sine and cosine components of the relative phase angle between the sum and delta channel signals. Thus, a calculation of the arc-tangent function of the I and Q signals can be performed to compute the phase angle of the reply signal. In actual practice, a look-up table associated with the reply processor can be used to provide the phase angle information based on the I and Q values so that the arc-tangent computation can be obviated for unburdening the processing calculations The phase angle thus derived from the I and Q signals corresponds to the angle of arrival (AOA) of each of the pulses received as part of a reply signal.

Thus, from the omnidirectional top antenna 12, I and Q signals as well as a log video signal are produced for the pulse amplitude modulated signals received by the antenna 12. The I and Q signals 32,34 and the log video signal 28 are input to a reply processor 40. The basic function of the reply processor 40, is described in U.S. Pat. No. 5,387,915, entitled "METHOD AND APPARATUS FOR DETECTING AND DECODING TRANSPONDER REPLY SIGNALS", issued on Feb. 7, 1995, and commonly owned by the assignee of the present invention, the entire disclosure of which is expressly and fully incorporated herein by reference. The reply processor 40 analyzes the data available for each received pulse including the I, Q and log video data from the top antenna in order to identify pulses that can be matched together so as to provide signal content information for discrete data time intervals to form a reply signal and related reply or target report. The target reports are then sent to or are accessed by the main processor 18 in the form of an electronic reply code report in order to develop and maintain tracking information of responding aircraft called targets.

In the embodiment illustrated in FIG. 1, the system 10 further includes the bottom antenna 14 which in this case is a single monopole antenna that does not provide directional or bearing information such as is provided by the top antenna. The bottom antenna is primarily used as a second source of time and amplitude based information for the received reply signals in the event that the signals received by the top antenna are too garbled to permit clean identification or are not received at all. Signals received by the bottom antenna 14 are coupled to a bottom antenna receiver 42 which converts the bottom antenna signals to a corresponding log video signal 44 at the video frequency. This bottom antenna log video signal 44 is also input to the reply processor 40.

After an interrogation signal is transmitted through the top antenna delta channel 22 by the interrogating aircraft, the main processor 18 sends a listen-in-window (LIW) control signal to the reply processor 40. A series of interrogation signals may be used in an interrogation sequence, such as used during a "whisper/shout" interrogation sequence. Each interrogation signal will have a corresponding LIW period. The LIW signal 48 is used to control the allowable time period during which a valid reply signal or signals are permitted to be received and processed. In this case, the listen window period is set up to about 400 microseconds which corresponds to an approximate range of thirty-four nautical miles. Thus, the transponder of any aircraft within the thirty-four nautical mile radius of the interrogating aircraft that receives the interrogation signal will respond by transmitting omnidirectionally a reply signal.

For purposes of understanding and practicing the present invention, a detailed understanding of the reply processor 40 and main processor 18 is not required. It will suffice to understand that the reply signal processing and target tracking are dependent in many respects on accurate determination of the angle of arrival information of the reply signals. The angle of arrival information in turn is dependent on accurate relative phase detection between the sum and delta channels (and corresponding I and Q signals), hence the calibration technique described herein is particularly useful for improving the accuracy of the system 10.

With continued reference then to FIG. 1, the system 10 includes built-in-test and calibration methods and apparatus according to the present invention.

The system 10 includes a built-in-test (BIT) circuit or module 300, that is under the control of the main processor 18. The main processor software routine includes instructions to the BIT module 300 to output a 1090 MHz test or calibration signal to the top antenna 12. Thus, the BIT circuit 300 can simply be realized in the form of an oscillator circuit that produces a 1090 MHz pulsed excitation signal that simulates a reply signal such as might be received from a responding aircraft in response to an ATCRBS interrogation. The BIT module 300 can also be used conveniently to produce the 1030 MHz RF transmission frequency used for the interrogation signal transmitted by the interrogating aircraft through the top antenna, as previously described herein.

According to an important aspect of the invention, the main processor 18 instructions are sent periodically, such as for example every fifteen to thirty seconds, or at any other suitable rate as desired, to allow an on-going real time calibration capability for the system 10. Of course, calibrations only at start up or at other non-periodic intervals can be used if desired. An advantage of the periodic calibration, however, is that it provides a timely built-in-test for catastrophic failures in the antenna, receivers and other circuits, as well as providing accurate up to date information for quickly compensating changes in circuit parameters that can induce undesirable phase shifts.

The BIT module excitation signal of 1090 MHz is coupled into the top antenna 12 by a BIT probe 302. The BIT probe 302 couples the 1090 MHz test signal directly into the antenna monopole elements, so that the antenna provides sum and delta output signals to the top antenna receiver sections 24,26 as if the test signal had been received from a remote transmitter. In accordance with another important aspect of the invention, the test signal is not coupled into the receiver sections 24,26 by RF coupling, but rather the signal is directly input to the antenna elements via capacitive coupling between the BIT probe 302 and the individual antenna elements. In this manner, the BIT excitation signal can be applied by a single wire to the BIT probe, and will not affect the phase measurements made during calibration.

With reference to FIGS. 2A and 2B, we show in greater detail one embodiment for coupling a calibration signal into the top antenna elements so as to be able to normalize the system 10 performance based on the detected phase shift from the calibration standard. In the embodiment described herein, the top antenna 12 includes four monopole elements 304, 306, 308 and 310 labelled A, B, C and D respectively. An RF hybrid combiner 312 is used in a conventional manner to combine the electrical signals from the antenna elements to produce the sum and delta channel outputs. The hybrid combiner 312 also receives the calibration test signal (designated BIT in FIGS. 2A and 2B), and the calibration signal is coupled into the antenna elements 304–310.

In accordance with the invention, characterization data for the antenna 12 is obtained, which data provides an electrical degree (i.e. the phase angle) vs. mechanical angle (i.e. bearing) response of the antenna for all bearing angles. For example, the antenna can be placed in a test cell and tested for each electrical phase difference at the sum and delta channel output terminals produced as a "target" is mechanically moved 1 mechanical angle degree at a time for the entire 360 degree response. This characterization data can, if desired, be averaged for several antennas so that characterization data is not required for each separate antenna installation. The characterization data is then stored in a look-up table in the main processor 18 memory, for example. In this way, when the reply processor 40 sends electrical phase angle data to the main processor relating to a target's bearing, the main processor 18 can use the look-up table to convert the electrical phase signals to mechanical bearing information based on the known antenna response characteristics.

The BIT probe is coupled to the antenna 12 to produce, in response to a BIT excitation signal, sum and delta channel calibration signals that simulate a reply signal from a remote responding aircraft at a known bearing or angle of arrival (AOA), hereafter referred to as the antenna BIT phase. The entire reply signal decoding function of the system 10 can thus be self-tested by using a calibration signal that is essentially a known reply signal. The reply signal processor and decoding algorithms described in the referenced co-pending application, can be used to detect and decode the calibration signals as if the signals were true reply signals, thus providing not only a self-test for phase errors (by comparing the known AOA and actual or measured AOA detected), but also providing an inherent self test of the system processors and software. The more complex the calibration signals are made, the more self-test functions that can be checked out.

In particular, the BIT probe and antenna are specified so that when a test signal is applied to the BIT probe 302, the corresponding signals produced at the sum and delta outputs of the combiner produce a known electrical phase difference (antenna BIT phase), such as, for example, –45 degrees, which will correspond to a known mechanical target bearing (AOA), such as for example 105 degrees. In this example, the calibration signal applied to the BIT probe produces sum and delta channel signals that would appear to the system 10 as if they were produced by a reply signal from a responding aircraft at a bearing of 105 degrees. By producing a known antenna BIT phase at the output of the combiner during calibration, the accuracy of the I and Q and AOA determination functions of the system 10, as previously described herein, can be assessed.

Stated another way, the BIT probe and antenna are configured so that when a calibration excitation signal is applied to the BIT probe, the known electrical phase difference (–45 degrees) of the sum and delta channels at the antenna ports corresponds to a simulated target at 105 degrees bearing (AOA) within a specified tolerance, such as for example, two degrees. If the actual BIT phase (as determined from the calibration I/Q signals) measured by the system 10 is different from the known BIT phase difference of –45 degrees, then the system can use the phase error or offset to compensate for actual reply signal phase measurements. Thus, the phase error detected between the known BIT phase in the calibration sum and delta signals and the actual BIT phase measured by the system 10 can be simply added or subtracted as a correction factor for target AOA measurements.

In the embodiment described herein, the known antenna BIT phase (in this case corresponding to a target bearing or AOA of 105 degrees) is incorporated into the antenna characterization look-up table, meaning that the electrical phase for each mechanical angle or degree in the table is expressed relative to the known antenna BIT phase. This can be done by subtracting the known BIT phase from each phase angle used as an entry value to the table. The purpose for doing this is so that the measured BIT phase angle can be subtracted from each measured phase angle of each of the actual reply signals. Since the measured BIT phase angle will contain the same phase shift errors and offsets as the measured reply signal phase angle, these errors will cancel each other. The difference then will be a value that corresponds to the true phase angle without any phase inaccuracy due to the circuitry used to process the I and Q signals. However, in order for this measured BIT phase subtraction process to work, the look-up table is also referenced to the BIT phase angle.

For example, in the described example, the known BIT phase angle is –45 degrees, and the table must produce an output of 105 degrees mechanical when the phase angle entry value to the table is –45 degrees. Therefore, the zero entry value for the table is assigned the 105 degree mechanical angle output value. This means that a table output corresponding to 105 degrees mechanical angle (AOA) is produced for a zero (0) entry or input phase angle value.

The zero entry value is derived by subtracting the BIT phase from the phase angle that is to correspond to the 105 degree mechanical angle. In this example then, the BIT phase of –45 represents a table entry value of 0 (–45–(–45)=0). The table output value for the 0 entry value is set to correspond to 105 degrees mechanical angle. Every other entry value to the table is similarly determined by subtracting the known BIT phase angle from the phase angle for the entry value.

The measured phase angles from actual replies are then referenced in a similar manner to the BIT phase by subtracting the measured BIT phase from the measured phase angle of the actual reply prior to accessing the look-up table. All unknown phase shifts introduced into the system 10 appear in the measurements of both the actual reply signal phase angle and the injected BIT signal phase angle, thereby cancelling each other. In other words, phase errors in the system 10 will affect measured reply signal AOA data (from actual targets) exactly the same as measured BIT phase data (from the calibration signals). Thus, subtracting the two cancels the phase error contribution and the result can be used with the look-up table that has the BIT phase incorporated in the table. Of course, the look-up table does not have to be normalized to the BIT phase in order to practice the invention, although this method is preferred.

To continue with the example herein, suppose the phase angle circuitry in the system 10 has an error or phase offset of 100 degrees. This means that during calibration, the measured BIT phase of –45 degrees will appear as 100–45=55 degrees. Now, if an actual target reply signal produces a phase angle of 55 degrees, the measured BIT phase is subtracted from this number before accessing the look-up table, or 55–55=0. The look-up table entry value is thus 0, which corresponds to 105 degrees mechanical, as expected, because in this example the target produces the same phase angle as the BIT phase.

By periodically injecting the calibration signal into the antenna 12, the system 10 can continually calibrate for changes in phase shifts that can occur in the many ways identified hereinbefore, for example, over operating time and temperature of the system 10. As an example, it is possible that during system start-up, the initial calibration might be performed while the top antenna elements are wet. After taxi or takeoff, the antenna will be dry and thus could exhibit substantially different phase characteristics from the time of initial calibration. By periodically updating the phase variations, the system 10 can use the most recent measured BIT phase information to attain accurate I/Q and AOA information on actual replies received from responding aircraft. Also, by storing the initial measured BIT phase calibration reading into a memory device, the system 10 can detect when components, such as antenna cables, have been changed or swapped, because the self-test capability will detect the resultant phase shifts.

With reference to FIG. 2B, the combiner 312 actually includes three 180° combiners, 314, 316, 318, and a 90° combiner 320 which function to produce the sum and delta channel outputs 20,22. The bit probe 302 includes a conventional four-way splitter 322 well known to those skilled in the art, that simply splits the calibration signal into four equal channels (BIT A, B, C and D), one for each antenna element. The calibration signals (BIT A,B,C,D) are summed into their respective antenna element, such as by a capacitive summing network, 324, 326, 328 and 330 as is well known to those skilled in the art. In this case, because the hybrid combiner is incorporated into the antenna assembly, the BIT probe arrangement can be specified so as to produce a known electrical phase difference in the sum and delta signals from the antenna that corresponds to a simulated target AOA. A suitable antenna with an integrated hybrid combiner and BIT probe is part no. S72-1744 available from Sensor Systems, Inc.

The invention thus provides apparatus and methods for detecting and decoding reply signals including apparatus and methods for calibration and self-test to compensate for phase shifts and errors that could adversely affect AOA measurements.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. In combination, means for receiving one or more electromagnetic data encoded signals from a transmitter and producing in response to each data signal two signals having a phase relationship, said receiving means comprising an antenna; signal processing means for using said phase relationship to determine information related to said data signals; and means for coupling a calibration input signal into said antenna to produce two calibration signals having a known phase relationship; said signal processing means using said known phase relationship to compensate for phase errors when processing said data signals.

2. The combination of claim 1 wherein said calibration signals are coupled into said antenna periodically to update phase calibration on a real time basis.

3. The combination of claim 1 wherein said antenna is a four element omnidirectional antenna that produces said two signals as sum and delta signals whose phase relationship is related to angle of arrival of said data signals.

4. The combination of claim 3 wherein each element of said antenna is a monopole antenna.

5. The combination of claim 4 wherein said antenna comprises means for producing said sum and delta signals based on a combination of signals received by said elements.

6. The combination of claim 3 wherein said calibration signals are capacitively coupled into said elements and produce sum and delta signals that have a known phase relationship.

7. The combination of claim 6 wherein said signal processing means comprises a phase comparator that produces in-phase and quadrature phase signals which represent sine and cosine values of said phase relationships.

8. The combination of claim 7 wherein said data signals are transmitted from an airplane in response to an interrogation signal.

9. The combination of claim 8 wherein said transmitter is a transponder responsive to secondary surveillance radar interrogations and that transmits encoded altitude pulses in a reply signal.

10. The combination of claim 9 wherein angle of arrival information is used by said signal processing means to associate encoded pulses with a reply signal.

11. The combination of claim 1 wherein said signal processing means comprises memory means for storing a look-up table that corresponds electrical phase vs. mechanical degree characteristics of said antenna.

12. The combination of claim 11 wherein said signal processing means detects phase error between said known phase relationship for said two calibration signals and a measured phase relationship for said two calibration signals.

13. The combination of claim 12 wherein said signal processing means uses said detected phase error from said calibration signals to compensate the measured phase relationship for said two signals produced from a data signal.

14. Apparatus for calibrating an antenna/receiver system of the type that uses an antenna to receive a data signal from a transmitter, means for producing in response to the data signal two phase related signals, and signal processing means for determining said two phase related signals' phase relationship to determine a characteristic of the data signal; said calibrating apparatus comprising means for coupling a calibration signal into the antenna to produce two phase related calibration signals having a known phase relationship, means for detecting a difference between said known phase relationship and a measured phase relationship for said phase related calibration signals, and means for compensating phase determinations of said two phase related signals based on said difference, said compensating means comprising means for storing antenna characterization data that corresponds electrical phase data to corresponding mechanical bearing data.

15. A method for calibrating an antenna/receiver system of the type that uses an antenna to receive a data signal from a transmitter, means for producing in response to the data signal two electrical signals having a phase relationship, and signal processing means for using said phase relationship to determine characteristics of said encoded signal; the method comprising the steps of:

a. coupling a calibration excitation signal into the antenna to produce two calibration signals having a known phase relationship;

b. detecting a measured phase relationship between the two calibration signals; and c. using detected difference between said known phase relationship and said measured phase relationship to compensate phase relationship information for said two signals corresponding to the data signal.

16. The method of claim 15 wherein the step of coupling a calibration signal into the antenna is performed periodically to obtain real-time calibration of phase errors in the system.

17. The method of claim 16 wherein the step of coupling a calibration signal into the antenna is performed by directly injecting the calibration signal into the antenna elements.

18. The method of claim 17 wherein the calibration signal is capacitively coupled into the antenna, and further comprising the step of storing antenna characterization data that relates electrical phase data to corresponding bearing information.

19. The method of claim 18 wherein said phase errors are detected and used to compensate angle of arrival determinations of reply signals transmitted to the antenna.

20. The method of claim 19 wherein said angle of arrival information is used to associate encoded data pulses with a reply signal.

21. The method of claim 15 wherein said calibration signals produce a known BIT phase that corresponds to a simulated target at a known bearing.

22. The method of claim 21 wherein antenna characterization data that relates electrical phase to mechanical bearing is stored in a memory and referenced to said known BIT phase.

23. The method of claim 22 further comprising the step of subtracting a measured BIT phase from a measured data signal phase to cancel system phase errors.

* * * * *